(12) United States Patent
Bohm et al.

(10) Patent No.: US 9,118,682 B2
(45) Date of Patent: Aug. 25, 2015

(54) HANDLING HTTP-BASED SERVICE REQUESTS VIA IP PORTS

(75) Inventors: Fraser P. Bohm, Salisbury (GB); Martin W. J. Cocks, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 839 days.

(21) Appl. No.: 13/416,961

(22) Filed: Mar. 9, 2012

(65) Prior Publication Data

US 2013/0060909 A1 Mar. 7, 2013

Related U.S. Application Data

(63) Continuation of application No. 13/226,849, filed on Sep. 7, 2011, now abandoned.

(51) Int. Cl.
*G06F 15/16* (2006.01)
*H04L 29/08* (2006.01)

(52) U.S. Cl.
CPC ........ *H04L 67/1006* (2013.01); *H04L 67/1008* (2013.01); *H04L 67/1027* (2013.01)

(58) Field of Classification Search
CPC ............ H04L 67/1006; H04L 67/1008; H04L 67/1027
See application file for complete search history.

(56) References Cited

U.S. PATENT DOCUMENTS

| | | | |
|---|---|---|---|
| 6,336,147 B1 | 1/2002 | Brownell et al. | |
| 7,009,938 B2 | 3/2006 | Banerjee et al. | |
| 7,231,445 B1 | 6/2007 | Aweya et al. | |
| 7,567,504 B2 | 7/2009 | Darling et al. | |
| 7,734,726 B2 | 6/2010 | Dantzig et al. | |
| 7,752,629 B2 | 7/2010 | Revanuru et al. | |
| 2003/0021260 A1* | 1/2003 | Daley et al. | 370/352 |
| 2005/0055435 A1 | 3/2005 | Gbadegesin et al. | |
| 2007/0288619 A1 | 12/2007 | Jun et al. | |

OTHER PUBLICATIONS

U.S. Appl. No. 13/226,849—Non-Final Office Action Mailed Mar. 19, 2013.
T. Voigt et al., "Handling Persistent Connections in Overloaded Web Servers", 2001, pp. 1-2.
M. Rumsewicz, "Load Balancing and Control Algorithm for a Single Site Web Server", http://memex.dsic.upv.es/spw/viejo/otros%20productos/eddie/Load_Balancing.ps.gz.
The Internet Society, "Hypertext Transfer Protocol—HTTP/1.1: 8.1 Persistent Connections", Jun. 1999, http://www.w3.org/Protocols/rfc2616/rfc2616.html.

* cited by examiner

*Primary Examiner* — Yves Dalencourt
(74) *Attorney, Agent, or Firm* — Law Office of Jim Boice

(57) ABSTRACT

A computer implemented method handles service requests for HTTP-based services via IP ports that are located on HTTP servers. These HTTP servers are logically coupled to a port sharing mechanism that handles service requests from clients, and each of the multiple HTTP servers provides the same HTTP-based service. A request for the HTTP-based service is sent to an IP port in a first HTTP server. However, this IP port has a current number of active IP connections that exceeds a soft cap. Nonetheless, this IP port is directed to accept and execute the request, and then to terminate its connection with the client. Any subsequent request for this same HTTP-based service is directed to another of the multiple HTTP servers.

20 Claims, 3 Drawing Sheets

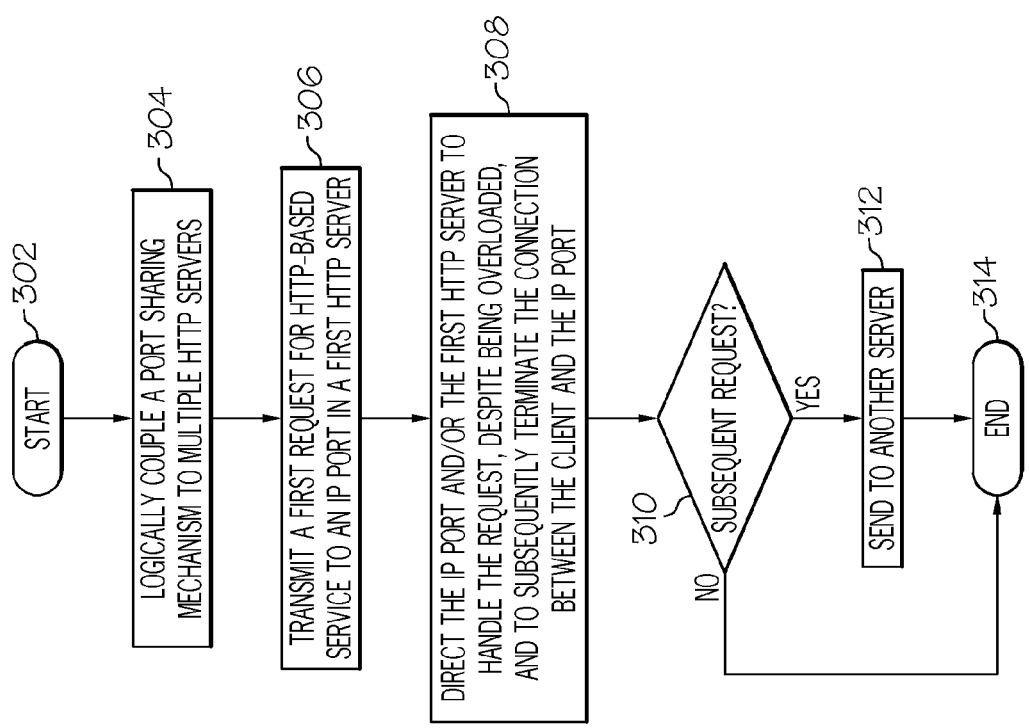

HANDLING HTTP-BASED SERVICE REQUESTS VIA IP PORTS

The present application is a continuation of U.S. patent application Ser. No. 13/226,849, filed on Sep. 7, 2011, and titled, "Handling HTTP-Based Service Requests Via IP Ports," which is incorporated herein by reference.

BACKGROUND

The present disclosure relates to the field of computers, and specifically to computer systems that utilize Internet Protocol (IP) ports. Still more particularly, the present disclosure relates to handling overflow conditions in IP ports on Hypertext Transfer Protocol (HTTP) servers.

HTTP servers provide access to HTTP-based services, such as web pages, etc. Communication sessions between a requesting client and the HTTP servers are often via one or more IP ports on the HTTP servers. These communication sessions may be persistent or temporary.

SUMMARY

A computer implemented method handles service requests for HTTP-based services via IP ports that are located on HTTP servers. These HTTP servers are logically coupled to a port sharing mechanism that handles service requests from clients, and each of the multiple HTTP servers provides the same HTTP-based service. A request for the HTTP-based service is sent to an IP port in a first HTTP server. However, this IP port has a current number of active IP connections that exceeds a soft cap. Nonetheless, this IP port is directed to accept and execute the request, and then to terminate its connection with the client. Any subsequent request for this same HTTP-based service is directed to another of the multiple HTTP servers.

BRIEF DESCRIPTION OF THE SEVERAL VIEWS OF THE DRAWINGS

FIG. 3 is a high level flow chart of one or more exemplary steps taken by a processor to handle service requests for HTTP-based services via IP ports that are located on HTTP servers.

DETAILED DESCRIPTION

Figure 1:
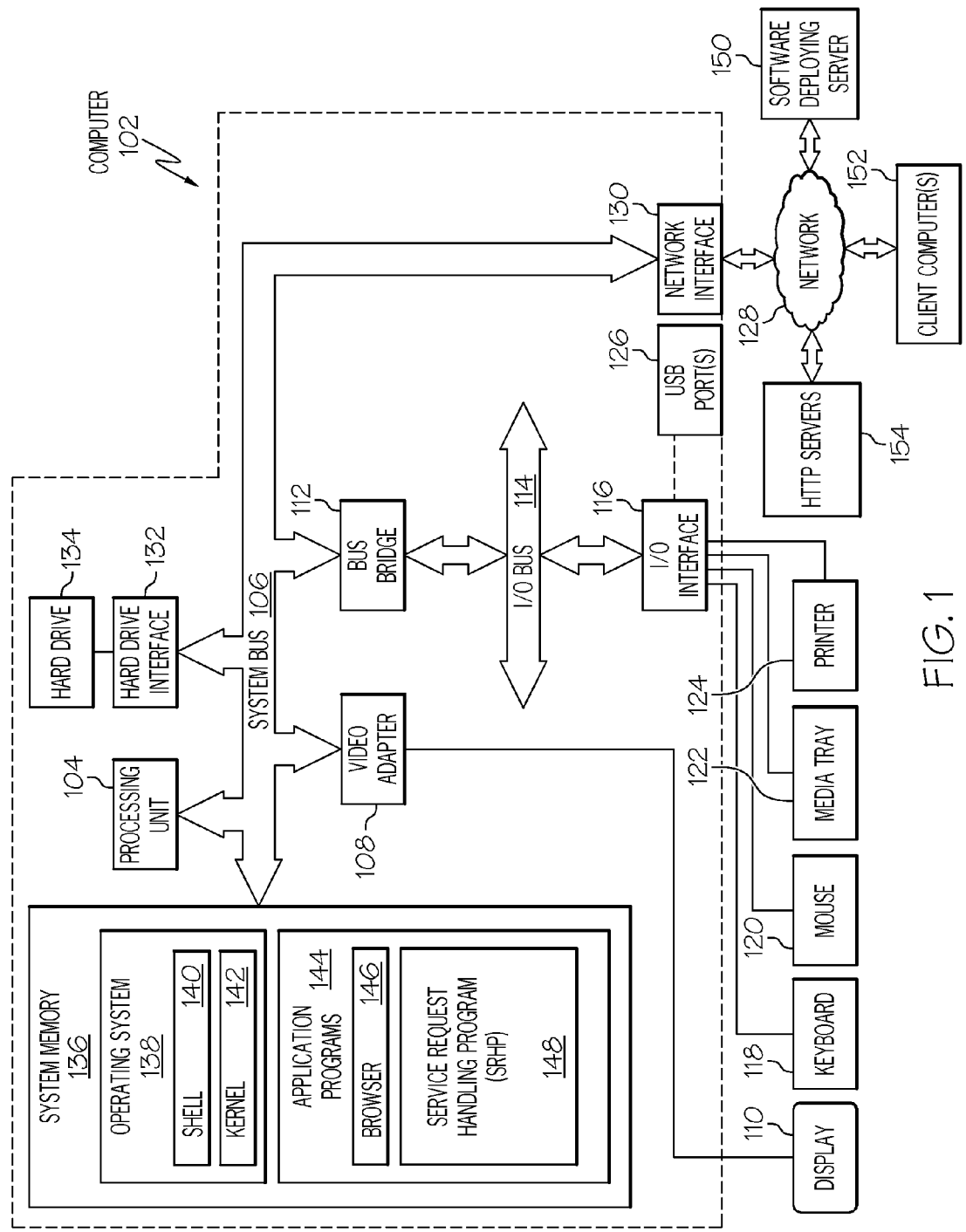
FIG. 1 depicts an exemplary computer in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary computer 102, which may be utilized by the present disclosure. Note that some or all of the exemplary architecture, including both depicted hardware and software, shown for and within computer 102 may be utilized by software deploying server 150, client computer(s) 152, and/or Hypertext Transfer Protocol (HTTP) servers 154.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 and/or client computer(s) 152 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present disclosure will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a service request handling program (SRHP) 148. SRHP 148 includes code for implementing the processes described below, including those described in FIGS. 2-3. In one embodiment, computer 102 is able to download SRHP 148 from software deploying server 150, including in an on-demand basis, such that the code from SRHP 148 is not downloaded until runtime or otherwise immediately needed by computer 102. Note further that, in one embodiment of the present disclosure, software deploying server 150 performs all of the functions associated with the present disclosure (including execution of SRHP 148), thus freeing computer 102 from having to use its own internal computing resources to execute SRHP 148.

The hardware elements depicted in computer 102 are not intended to be exhaustive, but rather are representative to highlight essential components required by the present disclosure. For instance, computer 102 may include alternate memory storage devices such as magnetic cassettes, digital versatile disks (DVDs), Bernoulli cartridges, and the like. These and other variations are intended to be within the spirit and scope of the present disclosure.

Figure 2:
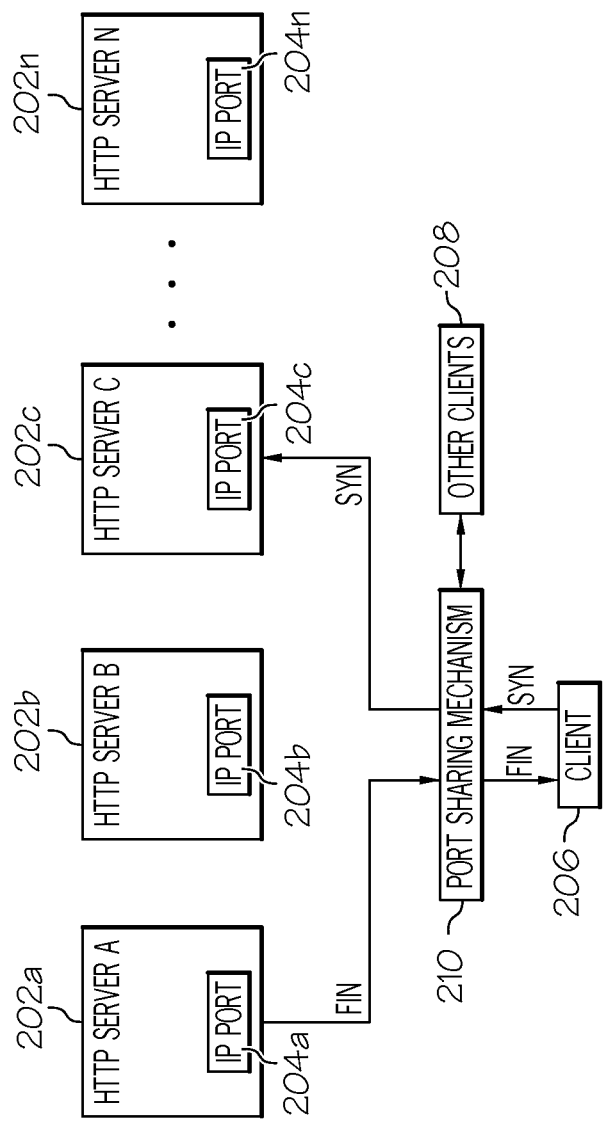
FIG. 2 illustrates an exemplary port sharing mechanism that directs client requests for HTTP-based services to one of multiple HTTP servers.

With reference now to FIG. 2, consider the exemplary back office systems depicted as HTTP servers 202a-n (HTTP Servers A-N), where "n" is an integer. HTTP servers 202a-n are analogous to the HTTP servers 154 depicted in FIG. 1. In one embodiment, each of the HTTP servers provides a same HTTP-based service, such as providing access to web pages, providing access to a specific web page, providing access to a portal, providing access to a web service (e.g., an application that runs on a computer that is remote from the client's computer), etc. That is, each of the HTTP servers 202a-n has the architecture/software needed to provide the same service as any of the other HTTP servers 202a-n, although perhaps without having the same current capacity due to overloading (as described below). As depicted in FIG. 2, each of the HTTP servers 202a-n has its own and separate IP port (e.g., one of IP ports 204a-n), such that none of the HTTP servers 202a-n shares any of the IP ports 204a-n.

Logically coupled to the IP ports 204a-n is a port sharing mechanism 210, which is analogous to computer 102 in FIG. 1, and thus in one embodiment port sharing mechanism 210 utilizes some or all of the architecture depicted for computer 102. The port sharing mechanism 210 directs requests for HTTP-based services from a client 206 (analogous to client computer 152 shown in FIG. 1) to one of the HTTP servers 202a-n via an associated IP port from IP ports 204a-n. In one embodiment, port sharing mechanism 210 keeps track of which, if any, of the IP ports 204a-n have exceeded either a "hard cap" or a "soft cap" (described below). This information regarding hard/soft cap status is provided by the HTTP servers 202a-n and/or the IP ports 204a-n.

While not explicitly depicted in FIG. 2, assume that client 206 has sent a request for the same HTTP-based service (i.e., the same HTTP-based service that is provided by any and all of the HTTP servers 202a-n) to HTTP server 202a via port sharing mechanism 210 and IP port 204a. However, IP port 204a is currently overloaded. That is, IP port 204a has a current number of active IP connections and/or transaction requests in a pending transaction queue that exceed a soft cap of a predetermined value. For example, a soft cap may be such that if there are more than five transaction requests pending in IP port 204a, either from client 206 or from client 206 and other clients 208, then IP port 204a is considered to be "soft cap" overloaded. However, this "soft cap" is not the same as a "hard cap." That is, a hard cap, as will be discussed further below, is a fixed cap on how many transactions can be pending in an IP port. If the hard cap is exceeded, then that IP port simply refuses to initiate a transaction session with the requesting client (e.g., refuses to complete a three-way handshake of SYN/SYN-ACK/ACK between the server and the client).

In accordance with one embodiment of the present invention, however, a "soft cap" results in a processor in the port sharing mechanism (or alternatively, a processor within the HTTP server 202a) directing IP port 204a and HTTP server 202a to accept and execute client 206's request for the HTTP-based service, despite the current number of active IP connections in the IP port 204a exceeding the soft cap. Exceeding the soft cap also results in a message being sent (either from the port sharing mechanism 210 or from the HTTP server 202a) directing the IP port 204a and/or the HTTP server 202a to subsequently terminate the Transmission Control Protocol/Internet Protocol (TCP/IP) connection between the IP port 204a and the client 206 after executing/fulfilling the request for HTTP-based service. Further, as depicted in FIG. 2, a "FIN" message is sent to the client 206 from the IP port 204a, instructing the client 206 to terminate (i.e., to clear the session on the client 206's side) the TCP/IP session between the IP port 204a and the client 206.

In one embodiment, a hard cap can also be used with a soft cap. For example, assume that a hard cap is set for IP port 204a for a predefined peak traffic time period. This hard cap, which is a predefined limit for IP connections to the first IP port and in this embodiment is only in effect during the predefined peak traffic time, may be smaller or larger than the soft cap. Regardless of whether the hard cap is smaller or larger than the soft cap, if a determination is made that the hard cap has been exceeded during the predefined peak traffic time, then the instruction to the IP port 204a and HTTP server 202a to accept and execute the request from the client 206 for the HTTP-based service is overridden, and the connection between IP port 204a and client 206 is immediately terminated.

As depicted in FIG. 2 and suggested by the "SYN" command from client 206 to one of the IP ports 204a-n via the port sharing mechanism 210, client 206 will then send a subsequent request for a new TCP/IP session in order to access the same HTTP-based service that was being provided by HTTP server 202a (or which HTTP server 202a would have attempted to provide if a hard cap had been reached). Rather than resending this request to the same HTTP server 202a, the port sharing mechanism 210 will send the subsequent request to another of the HTTP servers 202b-n (e.g., HTTP server 202c via its IP port 204c). The port sharing mechanism 210 may direct the subsequent request from the client 206 according to various scenarios and embodiments described below.

In one scenario/embodiment, assume that "n" is a large number, such that there are numerous (e.g., thousands of) HTTP servers 202a-n. In this case, simple probability will ensure that the subsequent request will likely not be re-sent to the overloaded IP port 204a, but rather to another of the IP ports 204b-n.

In one scenario/embodiment, port sharing mechanism 210 interrogates a local register (not shown) of soft/hard cap statuses in the IP ports 204a-n, and thus "knows" which IP port from the IP ports 204a-n has the bandwidth/capacity to handle the subsequent request.

In one scenario/embodiment, the processor in the port sharing mechanism 210 previously transmitted an instruction to the client 206, instructing the client 206 to include an exclusionary message in the subsequent request for the same HTTP-based service. This exclusionary message directs the port sharing mechanism 210 to send this subsequent request for the same HTTP-based service to another HTTP server, from the multiple HTTP servers 202b-n, other than HTTP server 202a (e.g., "send the request to HTTP server 202c via IP port 204c").

Note that, in one embodiment, the hard caps and/or soft caps described herein are adjustable. For example, the size of a hard/soft cap can be adjusted according to a predicted level of request activity during a time of day, a day of the week, a season of the year, etc. Thus, if a level of request activity is predicted to be high (greater than some upper predefined level) during a certain time period, then all of the IP ports 204a-n will be called upon to handle high traffic, and thus the soft/hard caps are raised accordingly. Conversely, if the level of request activity is predicted to be low (less than some lower predefined level) during a certain time period, then all of the IP ports 204a-n will be less busy, and thus the soft/hard caps are lowered accordingly.

Note also that, in one embodiment, when determining if a hard/soft cap has been reached, consideration is given as to whether the current TCP/IP connections are persistent (exist until expressly terminated) or transient/temporary (automatically terminate before some predetermined length of time such as 30 seconds). Any TCP/IP connections, to a particular IP port, which are identified as being temporary are thus ignored when determining if that particular IP port has reached its soft/hard cap, since the temporary TCP/IP connections will "go away" soon anyway.

In one embodiment, as soon as a particular IP port (from IP ports 204a-n) has cleared out its queue of pending transactions (i.e., has fallen below its soft or hard cap), then that particular IP port is reopened. A message is then sent out (e.g., to the port sharing mechanism 210 and/or the client 206) from the particular IP port (e.g., IP port 204a) indicating that IP port 204a has been reopened to accept new requests. The reopening of IP port 204a and the sending out notifications of the reopening of IP port 204a may be under the control of the HTTP server 202a and/or the port sharing mechanism 210.

With reference now to FIG. 3, a high level flow chart of one or more processes performed by a processor for handling service requests for Hypertext Transfer Protocol (HTTP) based services via Internet Protocol (IP) ports on HTTP servers is presented. After initiator block 302, a port sharing mechanism is logically coupled to multiple HTTP servers (block 304). Each of the multiple HTTP servers provides a same HTTP-based service, and each of the multiple HTTP servers has a unique IP port that is not shared with any other HTTP server from the multiple HTTP servers. As described herein, the port sharing mechanism directs requests for HTTP-based services from a client to one of the multiple HTTP servers.

As depicted in block 306, a first request for the same HTTP-based service is transmitted to a first IP port in a first HTTP server from the multiple HTTP servers. However, the first IP port has a current number of active IP connections that exceed a soft cap (which has been set to a predetermined value). Nonetheless, as described in block 308, the first IP port and the first HTTP server are instructed (e.g., by a processor in the port sharing mechanism or within the first HTTP server itself) to accept and execute the request for the same HTTP-based service, despite the current number of active IP connections in the first IP port exceeding the soft cap. The first HTTP server is also instructed to subsequently terminate a connection between the first IP port and the client after executing the request for the same HTTP-based service.

As suggested in query block 310, the port sharing mechanism may receive a subsequent request for the same HTTP-based service from the client after the connection between the first IP port and the client has been terminated. If so, then the port sharing mechanism transmits that subsequent request to another HTTP server, from the multiple HTTP servers, which is other than the first HTTP server. The process ends at terminator block 314.

As described herein, the present invention presents a novel and useful improvement over the prior art. More specifically, instead of refusing any connection attempt above a present threshold level as in the prior art, the present invention instructs a back end system (e.g., HTTP servers) to nonetheless accept, process and respond to a request, even though the threshold level has been exceeded. As detailed above, when the response to the service request is sent back to the client, a message is also sent to indicate to the client that the connection is hereafter being terminated by the server. This feature forces a client, which wants to make further requests to the back end system, to re-establish a connection through the port sharing mechanism. The port sharing mechanism then connects the client to another back end system that is not above the threshold level.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer implemented method of handling service requests for Hypertext Transfer Protocol (HTTP) based services via Internet Protocol (IP) ports on HTTP servers, the computer implemented method comprising:

logically coupling a port sharing mechanism to multiple HTTP servers, wherein each of the multiple HTTP servers provides a same HTTP-based service, wherein each of the multiple HTTP servers has a unique IP port that is not shared with any other HTTP server from the multiple HTTP servers, and wherein the port sharing mechanism directs requests for HTTP-based services from a client to one of the multiple HTTP servers;

transmitting a first request for said same HTTP-based service to a first IP port in a first HTTP server from the multiple HTTP servers, wherein the first IP port has a current number of active IP connections that exceed a soft cap of a predetermined value;

a processor directing the first IP port and the first HTTP server to accept and execute said request for said same HTTP-based service, despite the current number of active IP connections in the first IP port exceeding the soft cap, and to subsequently terminate a connection between the first IP port and the client after executing said request for said same HTTP-based service;

the processor in the port sharing mechanism receiving a subsequent request for said same HTTP-based service from the client after said connection between the first IP port and the client has been terminated; and the processor in the port sharing mechanism transmitting the subsequent request for said same HTTP-based service to an HTTP server, from the multiple HTTP servers, other than the first HTTP server.

2. The computer implemented method of claim 1, further comprising:
setting a hard cap for the first IP port, wherein the hard cap is a predefined limit for IP connections to the first IP port, and wherein the hard cap is only in effect during a predefined peak traffic time; and
in response to determining that the hard cap has been exceeded during the predefined peak traffic time, overriding said directing of said first IP port and said first HTTP server to accept and execute said request for said same HTTP-based service and immediately terminating the connection between the first IP port and the client.

3. The computer implemented method of claim 1, further comprising:
identifying which IP connections with the first IP port are temporary connections, wherein a temporary connection is scheduled to automatically terminate before a predetermined length of time; and
ignoring the temporary connections when determining if said current number of active IP connections to said first IP port has exceeded said predetermined value.

4. The computer implemented method of claim 1, further comprising:
adjusting a size of the soft cap according to a predicted level of request activity for said same HTTP-based service during different times of a day.

5. The computer implemented method of claim 1, further comprising:
adjusting a size of the soft cap according to a predicted level of request activity for said same HTTP-based service during different days of a week.

6. The computer implemented method of claim 1, further comprising:
the processor in the port sharing mechanism transmitting an instruction to the client to include an exclusionary message in the subsequent request for said same HTTP-based service, wherein said exclusionary message directs said port sharing mechanism to send any subsequent request for said same HTTP-based service to said HTTP server, from the multiple HTTP servers, other than the first HTTP server.

7. The computer implemented method of claim 1, further comprising:
the processor in the port sharing mechanism transmitting a first instruction to the first HTTP server to reopen said first IP port in response to the current number of active IP connections in the first IP port falling below the soft cap; and
the processor in the port sharing mechanism transmitting a second instruction to the first HTTP server to transmit a reopen message indicating that the first IP port has reopened.

8. A computer program product for handling service requests for Hypertext Transfer Protocol (HTTP) based services via Internet Protocol (IP) ports on HTTP servers, the computer program product comprising:
a non-transitory computer readable storage medium;
first program instructions to transmit a first request for a same HTTP-based service to a first IP port in a first HTTP server from multiple HTTP servers, wherein the first IP port is logically coupled to a port sharing mechanism, wherein each of the multiple HTTP servers provides the same HTTP-based service, wherein each of the multiple HTTP servers has a unique IP port that is not shared with any other HTTP server from the multiple HTTP servers, wherein the port sharing mechanism directs requests for HTTP-based services from a client to one of the multiple HTTP servers, and wherein the first IP port has a current number of active IP connections that exceed a soft cap of a predetermined value;
second program instructions to direct the first IP port and the first HTTP server to accept and execute said request for said same HTTP-based service, despite the current number of active IP connections in the first IP port exceeding the soft cap, and to subsequently transmit a message to terminate a connection between the first IP port and the client after executing said request for said same HTTP-based service;
third program instructions to receive a subsequent request for said same HTTP-based service from the client after said connection between the first IP port and the client has been terminated; and
fourth program instructions to transmit the subsequent request for said same HTTP-based service to an HTTP server, from the multiple HTTP servers, other than the first HTTP server; and wherein
the first, second, third, and fourth program instructions are stored on the non-transitory computer readable storage medium for execution by a processor.

9. The computer program product of claim 8, further comprising:
fifth program instructions to set a hard cap for the first IP port, wherein the hard cap is a predefined limit for IP connections to the first IP port, and wherein the hard cap is only in effect during a predefined peak traffic time; and
sixth program instructions to, in response to determining that the hard cap has been exceeded during the predefined peak traffic time, override said directing of said first IP port and said first HTTP server to accept and execute said request for said same HTTP-based service and to immediately terminate the connection between the first IP port and the client; and wherein
the fifth and sixth program instructions are stored on the non-transitory computer readable storage medium for execution by a processor.

10. The computer program product of claim 8, further comprising:
fifth program instructions to identify which IP connections with the first IP port are temporary connections, wherein a temporary connection is scheduled to automatically terminate before a predetermined length of time; and
sixth program instructions to ignore the temporary connections when determining if said current number of active IP connections to said first IP port has exceeded said predetermined value; and wherein
the fifth and sixth program instructions are stored on the non-transitory computer readable storage medium for execution by a processor.

11. The computer program product of claim 8, further comprising:
fifth program instructions to adjust a size of the soft cap according to a predicted level of request activity for said same HTTP-based service during different times of a day; and wherein
the fifth program instructions are stored on the non-transitory computer readable storage medium for execution by a processor.

12. The computer program product of claim 8, further comprising:

fifth program instructions to adjust a size of the soft cap according to a predicted level of request activity for said same HTTP-based service during different days of a week; and wherein the fifth program instructions are stored on the non-transitory computer readable storage medium for execution by a processor.

13. The computer program product of claim 8, further comprising:
fifth program instructions to transmit an instruction to the client to include an exclusionary message in the subsequent request for said same HTTP-based service, wherein said exclusionary message directs said port sharing mechanism to send any subsequent request for said same HTTP-based service to said HTTP server, from the multiple HTTP servers, other than the first HTTP server; and wherein the fifth program instructions are stored on the non-transitory computer readable storage medium for execution by a processor.

14. The computer program product of claim 8, further comprising:
fifth program instructions to transmit a first instruction to the first HTTP server to reopen said first IP port in response to the current number of active IP connections in the first IP port falling below the soft cap; and
sixth program instructions to transmit a second instruction to the first HTTP server to transmit a reopen message indicating that the first IP port has reopened; and wherein the fifth and sixth program instructions are stored on the non-transitory computer readable storage medium for execution by a processor.

15. A computer system comprising:
a processor, a computer readable memory, and a non-transitory computer readable storage medium;
first program instructions to transmit a first request for a same HTTP-based service to a first IP port in a first HTTP server from multiple HTTP servers, wherein the first IP port is logically coupled to a port sharing mechanism, wherein each of the multiple HTTP servers provides the same HTTP-based service, wherein each of the multiple HTTP servers has a unique IP port that is not shared with any other HTTP server from the multiple HTTP servers, wherein the port sharing mechanism directs requests for HTTP-based services from a client to one of the multiple HTTP servers, and wherein the first IP port has a current number of active IP connections that exceed a soft cap of a predetermined value;
second program instructions to direct the first IP port and the first HTTP server to accept and execute said request for said same HTTP-based service, despite the current number of active IP connections in the first IP port exceeding the soft cap, and to subsequently terminate a connection between the first IP port and the client after executing said request for said same HTTP-based service;
third program instructions to receive a subsequent request for said same HTTP-based service from the client after said connection between the first IP port and the client has been terminated; and
fourth program instructions to transmit the subsequent request for said same HTTP-based service to an HTTP server, from the multiple HTTP servers, other than the first HTTP server; and wherein the first, second, third, and fourth program instructions are stored on the non-transitory computer readable storage medium for execution by the processor via the computer readable memory.

16. The computer system of claim 15, further comprising:
fifth program instructions to set a hard cap for the first IP port, wherein the hard cap is a predefined limit for IP connections to the first IP port, and wherein the hard cap is only in effect during a predefined peak traffic time; and
sixth program instructions to, in response to determining that the hard cap has been exceeded during the predefined peak traffic time, override said directing of said first IP port and said first HTTP server to accept and execute said request for said same HTTP-based service and to immediately terminate the connection between the first IP port and the client; and wherein the fifth and sixth program instructions are stored on the non-transitory computer readable storage medium for execution by the processor via the computer readable memory.

17. The computer system of claim 15, further comprising:
fifth program instructions to identify which IP connections with the first IP port are temporary connections, wherein a temporary connection is scheduled to automatically terminate before a predetermined length of time; and
sixth program instructions to ignore the temporary connections when determining if said current number of active IP connections to said first IP port has exceeded said predetermined value; and wherein the fifth and sixth program instructions are stored on the non-transitory computer readable storage medium for execution by the processor via the computer readable memory.

18. The computer system of claim 15, further comprising:
fifth program instructions to adjust a size of the soft cap according to a predicted level of request activity for said same HTTP-based service during different times of a day; and wherein the fifth program instructions are stored on the non-transitory computer readable storage medium for execution by the processor via the computer readable memory.

19. The computer system of claim 15, further comprising:
fifth program instructions to transmit an instruction to the client to include an exclusionary message in the subsequent request for said same HTTP-based service, wherein said exclusionary message directs said port sharing mechanism to send any subsequent request for said same HTTP-based service to said HTTP server, from the multiple HTTP servers, other than the first HTTP server; and wherein the fifth program instructions are stored on the non-transitory computer readable storage medium for execution by the processor via the computer readable memory.

20. The computer system of claim 15, further comprising:
fifth program instructions to transmit a first instruction to the first HTTP server to reopen said first IP port in response to the current number of active IP connections in the first IP port falling below the soft cap; and
sixth program instructions to transmit a second instruction to the first HTTP server to transmit a reopen message indicating that the first IP port has reopened; and wherein the fifth and sixth program instructions are stored on the non-transitory computer readable storage medium for execution by the processor via the computer readable memory.

* * * * *